US012785412B2

(12) United States Patent
Creviston et al.

(10) Patent No.: US 12,785,412 B2
(45) Date of Patent: Nov. 3, 2026

(54) ADAPTABLE PRECHARGE SYSTEM

(71) Applicant: GO ELECTRIC INC., Anderson, IN (US)

(72) Inventors: Alex S. Creviston, Muncie, IN (US); Thomas A. Parr, Parker City, IN (US); Terry L. Lamb, Sharpsville, IN (US)

(73) Assignee: Go Electric Inc., Anderson, IN (US)

( * ) Notice: Subject to any disclaimer, the term of this patent is extended or adjusted under 35 U.S.C. 154(b) by 0 days.

(21) Appl. No.: 17/236,631

(22) Filed: Apr. 21, 2021

(65) Prior Publication Data

US 2021/0328452 A1 Oct. 21, 2021

Related U.S. Application Data

(60) Provisional application No. 63/013,241, filed on Apr. 21, 2020.

(51) Int. Cl.
*H02J 50/12* (2016.01)
*H02J 7/04* (2006.01)

(52) U.S. Cl.
CPC .................................... *H02J 7/04* (2013.01)

(58) Field of Classification Search
CPC ........................................................ H02J 7/04
See application file for complete search history.

(56) References Cited

U.S. PATENT DOCUMENTS 5,045,771 A 9/1991 Kislovski
6,208,533 B1 * 3/2001 Ogawa .............. H02M 3/33523 363/21.08
6,285,091 B1 * 9/2001 Chan ....................... H02J 9/061 307/64
10,817,035 B1 * 10/2020 Kauffman ........... H02M 1/4225
2007/0008753 A1 * 1/2007 Kroes ..................... H02M 1/32 363/56.01
2008/0169792 A1 * 7/2008 Orr ....................... H02M 3/155 323/222
2012/0218250 A1 * 8/2012 Pei ....................... G09G 3/3655 345/212
2013/0038120 A1 * 2/2013 Mimatsu ................. H02J 1/102 307/77
2013/0063087 A1 * 3/2013 Martaeng ................ B60L 53/22 320/109

(Continued)

FOREIGN PATENT DOCUMENTS

CN 110967557 A 4/2020
DE 102013106854 1/2014

(Continued)

OTHER PUBLICATIONS

International Search Report and Written Opinion corresponding to PCT/US21/28409 dated Oct. 15, 2021.

(Continued)

*Primary Examiner* — Drew A Dunn
*Assistant Examiner* — Pamela J Jeppson
(74) *Attorney, Agent, or Firm* — Barnes & Thornburg LLP

(57) ABSTRACT

Adaptable precharge devices, systems, and methods implemented within electrical systems can manage voltage differential between different portions of the system to provide appropriate contactor closure conditions. Communication of power between source and load can be implemented while reducing impact to components which can improve lifecycle.

15 Claims, 7 Drawing Sheets

(56) References Cited

U.S. PATENT DOCUMENTS

| | | | | |
|---|---|---|---|---|
| 2014/0239919 | A1 | 8/2014 | Bernardon et al. | |
| 2015/0069829 | A1 | 3/2015 | Dulle et al. | |
| 2015/0084404 | A1 | 3/2015 | Hashim et al. | |
| 2015/0116006 | A1* | 4/2015 | Ferianz | H03K 17/04 327/109 |
| 2015/0171746 | A1* | 6/2015 | Pan | H02M 3/155 323/282 |
| 2018/0043783 | A1* | 2/2018 | Tabatowski-Bush | B60L 1/00 |
| 2019/0097438 | A1 | 3/2019 | Song et al. | |
| 2020/0274374 | A1* | 8/2020 | Zhuo | G01R 31/52 |

FOREIGN PATENT DOCUMENTS

| | | |
|---|---|---|
| DE | 102015010323 | 6/2016 |
| DE | 102016109866 | 11/2017 |
| DE | 102018004109 | 1/2019 |
| EP | 3421287 | 1/2019 |

OTHER PUBLICATIONS

Extended European Search Report issued in application No. 23179879.4, Oct. 26, 2023.

Extended European Search Report issued in application No. 21793252.4, Jan. 29, 2024.

First Office Action issued in CN202180029946.9 (Dec. 11, 2025).

Communication pursuant to Article 94(3) issued in European patent application No. 21 793 252.4 (Sep. 3, 2025).

* cited by examiner

ADAPTABLE PRECHARGE SYSTEM

CROSS-REFERENCE

This Non-provisional patent application claims the benefit of priority to U.S. Provisional Patent Application No. 63/013,241, filed on Apr. 21, 2020, entitled “ADAPTABLE PRECHARGE SYSTEM”, the contents of which are hereby incorporated by reference in their entirety, including but without limitation those portions concerning precharge.

FIELD

The present disclosure is directed to electrical systems, and more particularly, to electrical systems having portions with different voltage levels for communication with each other.

BACKGROUND

Communicating different portions of electrical systems, for example, by closure of a contactor arranged between the portions, can present challenges in managing voltage differential between the different portions. In the instance of a dead bus to be connected with a voltage source including a high voltage source, contactor closure causing sudden voltage change can damage components and/or reduce component lifetime if the voltage differential is too high. Traditional techniques for managing voltage differential between systems to be communicated can lack flexibility in implementation and/or can have low lifetime.

SUMMARY

The present application discloses one or more of the features recited in the appended claims and/or the following features which, alone or in any combination, may comprise patentable subject matter.

According to an aspect of the present disclosure, an adaptable precharge system for managing voltage drop for contactor operation between open and closed configurations, may comprise an inductive circuit section comprising at least one inductive element adapted for connection with a current sink; a switch in communication with the inductive circuit section to selectively transmit current; and a oneway current circuit section arranged for communication between the switch and a load section comprising the inductive circuit section.

In some embodiments, the load section may comprise the inductive circuit section and the current sink connected in series with each other. The oneway current circuit section may be arranged in parallel with the load section.

In some embodiments, the controller switch may be arranged in communication with a negative voltage segment of each a source voltage and the load section. The controller switch may be arranged in communication with a control operator for directing switch operation to govern a voltage differential across the at least one inductive element. The control operator may be configured to operate the switch to provide a fixed-time mode.

In some embodiments, in the fixed-time mode the control operator may operate the switch to manage peak current provided to the inductive circuit section for a predetermined time interval for switch closure based on the input voltage. The predetermined time interval may be determined by setting a maximum allowable voltage across the inductive circuit section based on the input voltage. The control operator may be configured to operate the switch to provide a current-controlled mode.

In some embodiments, in the current-controlled mode the control operator may operate the switch to limit maximum current provided to the inductive circuit section by regulation of a control time for switch closure based on the input current. The control time may be associated with the at least one inductive element as a function of maximum current and inductive load of the inductive circuit section relative to voltage across the inductive circuit section. The control time may be actively updated during switch cycling. In some embodiments, the control operator may determine the control time for each cycle of switch operation. The control operator may monitor current through the inductive circuit section as feedback for determination of the control time.

In some embodiments, the control operator may be configured to operate the switch to provide a fixed-frequency mode. In the fixed-frequency mode, the control operator may operate the switch to manage peak current by regulating a time delta for switch closure based on voltage across the inductive circuit section. The adaptable precharge system may be arranged for communication between a power source and the current sink to regulate precharging of the current sink for contactor operation.

In some embodiments, the power source may comprise a high voltage DC source. The power source may comprise a voltage source having voltage greater than the current sink. The power source may include a number of battery cells having voltage greater than the current sink. The current sink may include a number of battery cells. In some embodiments, the power source may include a portion (17*a*) of an isolated grid having voltage greater than the current sink. The current sink may include another portion (17*b*) of the isolated grid.

According to another aspect of the present disclosure, a method of precharging a load from a high voltage source may include operating a precharge circuit in a fixed-time mode; and responsive to determination that a voltage differential between the high voltage source and the load is below a predetermined threshold, operating the precharge circuit in a current-controlled mode.

In some embodiments, operating the precharge circuit in the fixed time mode may be performed responsive to determination of enabling connection between a high voltage source and a low voltage sink. Operating the precharge circuit in the fixed time mode may include switching a precharge circuit to manage peak current provided to the load for a predetermined time interval for switch closure based on input voltage from the high voltage source. The predetermined time interval may be determined by setting a maximum allowable voltage across an inductive circuit section of the precharge circuit based on the input voltage.

In some embodiments, operating the precharge circuit in the current-controlled mode may include switching to limit maximum current provided to an inductive circuit section of the precharge circuit by regulation of a control time for switch closure based on the input current. The control time may be associated with the inductive circuit section as a function of maximum current and inductive load of the inductive circuit section relative to voltage across the inductive circuit section. Operating the precharge circuit in the current-controlled mode may include actively updating the control time during switch cycling.

In some embodiments, operating the precharge circuit in the current-controlled mode may include determining the control time for each cycle of switching. Operating the precharge circuit in the current-controlled mode may include considering current through the inductive circuit section as feedback for determination of the control time. In some embodiments, the method may further comprise operating the precharge circuit in a frequency-fixed mode.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

A more complete understanding of disclosed embodiments and the utility thereof may be acquired by referring to the following description in consideration of the accompanying drawings, in which like reference numbers indicate like features, and wherein.

DETAILED DESCRIPTION OF THE DRAWINGS

Figure 1:
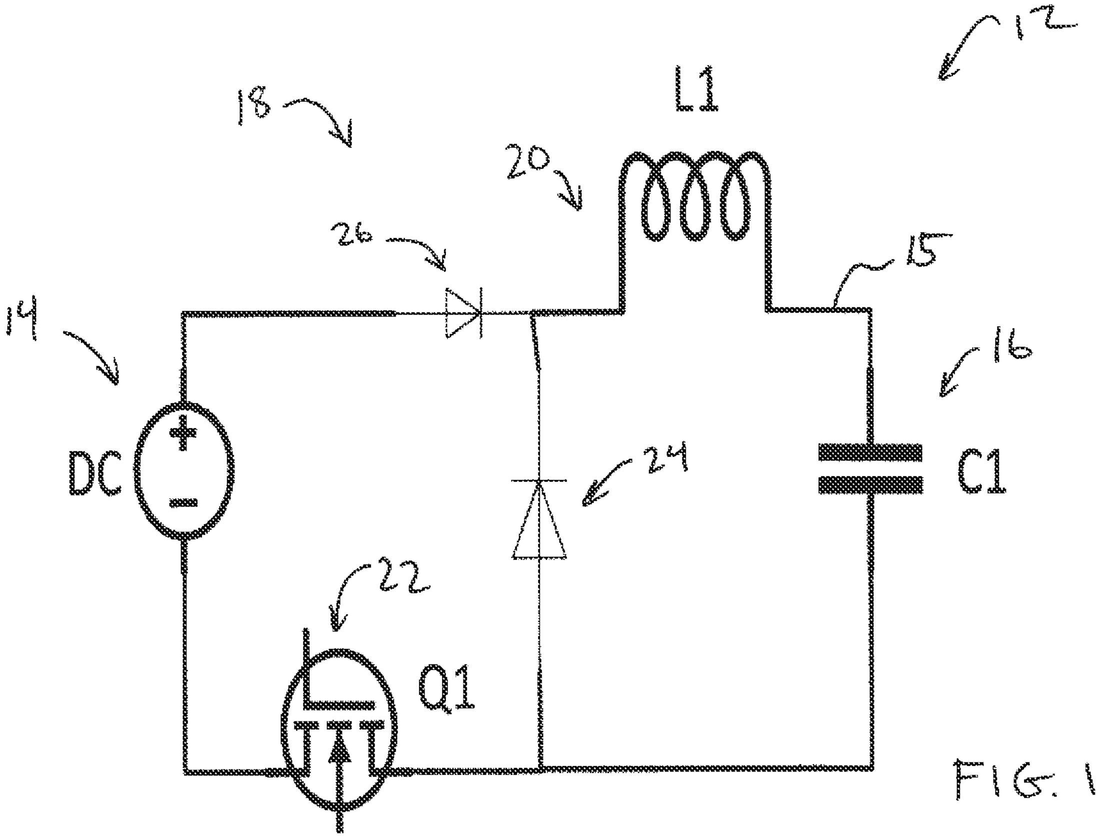
FIG. 1 is a diagrammatic view of an electrical system including an adjustable precharge system for managing voltage drop in contactor operation showing that a voltage source is arranged for selective connection with an inductive circuit section of the precharge system.

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and further applications of the principles of the disclosure which would normally occur to one skilled in the art to which the disclosure relates. Unless otherwise indicated, the components in the drawings are shown proportional to each other.

In communicating between systems and/or components initially having different energy levels, it can be desirable to regulate the initial interfacing between source and load. For example, when initially communicating between systems and/or components of different energy levels, limiting inrush current during the initial periods of communication can protect against stress or damage such as component failure and/or lifespan deterioration. However, traditional arrangements can require customization and/or limited range of effective operation. For example, purely resistive precharge circuits can be limited in lifespan themselves, can experience undesirable efficiency losses over time, can require highly application-specific design, and/or can require redesign for different precharge operations/cycles.

Referring to FIG. 1, an electrical system 12 is shown including a source 14 and a load 16. The source 14 can be illustratively embodied as a DC source and the load as a capacitive load initially having voltage considerably lower than the source 14. A precharge system 18 can be arranged in communication with each of the source 14 and load 16 to manage their intercommunication with each other.

The precharge system 18 can include an inductive section 20 and a switch 22. In the illustrative embodiment, the inductive section 20 may include one or more inductors arranged to selectively receive current under control of the switch 22. The inductive section 20 can be arranged as a load section such that the inductive section 20 is in serial connection with the load 16 to communicate power.

The inductive section 20 can include a bus section 15 connected with the load 16. The bus section 15 can represent portions of the load section which are initially at substantially lower voltage than the source 14. Although in some instances the bus section 15 may be without any initial voltage and considered a dead bus, in other instances, the bus section 15 may have some initial voltage still substantially lower than the source voltage.

The switch 22 can be arranged in communication with the inductive section 20 to govern power provided to the inductive section 20. The switch 22 can be illustratively arranged in serial connection with the load 16 and inductive section 20 on the low voltage side (negative terminal side) side of the circuit to govern power through the inductive section 20. In some embodiments, the switch 22 may be arranged in any suitable position for regulating power through the inductive section 20 and/or to the load 16, for example, by arrangement on the high voltage side (positive terminal side). In some embodiments, the switch 22 may comprise multiple switching elements arranged at different locations in the circuit for controlled operation.

Figure 2:
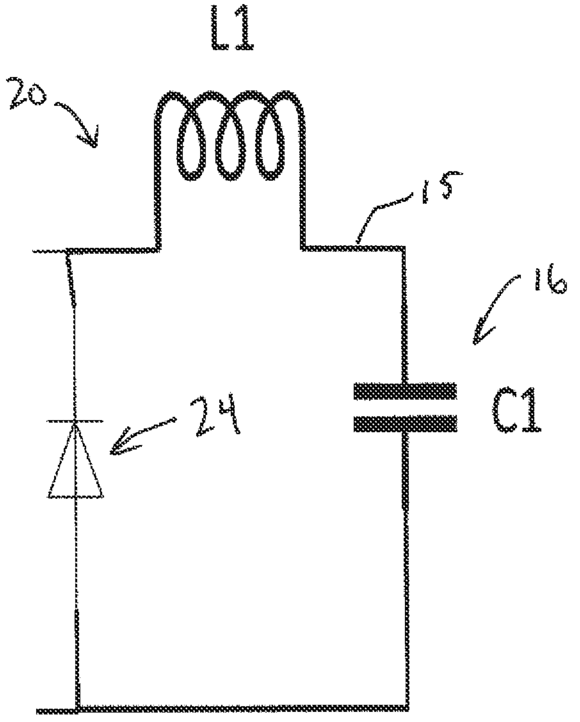
FIG. 2 is a diagrammatic view of the electrical system of FIG. 1 showing the electrical system in a state in which a switch is open to disconnect the source from the load.

A one way current element 24 can be arranged in communication between the switch 22 and the load section comprising the inductive section 20 and the load 16. The one way current element 24 can be illustratively embodied as a free-wheeling diode arranged to allow flow of current towards the inductive section 20, but to block current flow in the opposite direction from the source 14 bypassing the inductive section 20. For example, the one way current element 24 can be arranged to allow current to flow to the inductive section 20 that would otherwise pass to the switch 22, thus allowing the inductive section 20 to discharge continuous flow to a connected load such as through a dead bus. FIG. 2 shows an exemplary operational state of the circuit when the switch 22 is open. A one way element 26 embodied as a protection diode can be optionally arranged between the inductive section 20 and the source 14 as shown in FIG. 1.

Referring still to FIG. 1, the switch 22 can be illustratively embodied as a metal-oxide-semiconductor field-effect transistor (MOSFET) arranged for selective closure to permit communication with the opposite terminal of the source 14, illustratively the negative terminal in FIG. 1. In some embodiments, the switch 22 may include any suitable manner of switching element for governing precharge system 18 operations in accordance with the disclosures provided.

Figure 3:
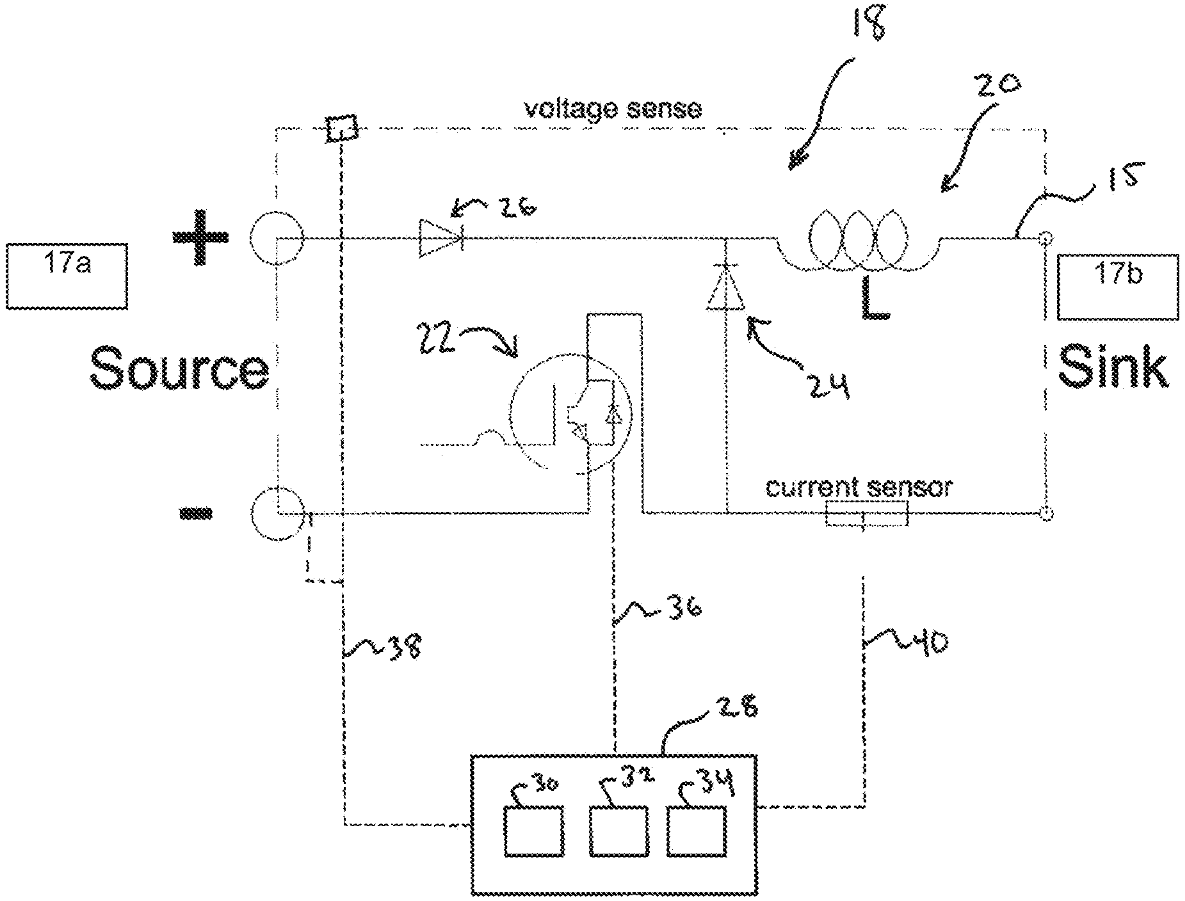
FIG. 3 is a diagrammatic view of the electrical system of FIGS. 1 and 2 showing the precharge system disconnected from a source and from a sink, and showing that the precharge system includes a control operator arranged in communication with a switch to govern operation of the precharge system.

Referring now to FIG. 3, the precharge system 18 is shown without connection to a source or load. A control operator 28 can be arranged in communication with the switch 22 to govern switch operations. The control operator 28 can be illustratively embodied as a centralized control system including a processor 30, memory 32, and communications circuitry 34.

Processor 30 can be configured to execute instructions stored on memory 32 to provide governing control and/or communications for operation of the switch 22 to govern precharge system 18 operations. Communications circuitry 34 can be arranged to send and/or receive signals according to direction by processor 30 to facilitate control operator 28 functions. The control operator 28 can be arranged in communication with the switch 22 to provide operational commands via communication line 36. Communication lines disclosed herein can be embodied as a hardwired connections, although in some embodiments, the communication lines may include any suitable communication medium whether hardwired and/or wireless.

Examples of suitable processors 30 can include one or more microprocessors, integrated circuits, system-on-a-chips (SoC), among others. Examples of suitable memory 32, can include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others.

The control operator 28 can be configured to determine operations for the switch 22 in accordance with precharge system 18 operating modes. The control operator 28 can be arranged in communication to receive indication of voltage of the precharge system 18 via communication line 38. The control operator 28 can receive indication of voltage from a connected source 14. The control operator 28 can receive indication of voltage across the inductive section 20. The communication line 38 can be connected with various voltage sensors to transmit indication of voltage to the control operator 28.

The control operator 28 can be arranged in communication to receive indication of current of the precharge system 18 via communication line 40. The control operator 28 can receive indication of current flowing from a connected load 16. The communication line 40 can be connected with various current sensors to transmit indication of current to the control operator 28.

The control operator 28 can determine and execute appropriate modes of operation for the precharge system 18. Responsive to indication that contactor closure is desired to communicate the source 14 with the load 16, the control operator 28 can determine to operate the precharge system 18 in a fixed-time mode to manage peak current transmitted to inductive section 20, and/or ultimately to the bus section 15 and load 16. In the fixed-time mode, the control operator 28 determines a duration of closure of the switch 22 as a predetermined time interval t for all cycles of switch closure.

The control operator 28 can determine the predetermined time interval t based on the voltage input from the source 14. The control operator 28 can receive indication of the voltage input from the source 14 and can determine a peak current $i_{pk}$ expected to be produced from the inductive section 20 based on the voltage input from the source 14. The control operator 28 determines the maximum allowable voltage $v_{max}$ to be permitted across the inductive section 20 in order to maintain the actual current i through the inductive section 20 to be less than or equal to the peak current $i_{pk}$. The control operator 28 determines predetermined time interval t based on the maximum allowable voltage $v_{max}$. By fixing the duration of switch closure as the predetermined time interval t, the control operator 28 can operate the precharge system 18 independently in the fixed-time mode.

The control operator 28 can determine to operate the precharge system 18 in a current-controlled mode to limit maximum current transmitted to inductive section 20, and/or ultimately to the bus section 15 and load 16. In the current-controlled mode, the control operator 28 actively determines a duration of closure of the switch 22 $t_c$ for each cycle of closure of switch 22. The control operator 28 can determine the duration of closure of the switch 22 $t_c$ for each cycle of switch closure based on the input current from the source 14.

The control operator 28 can determine the duration of closure of the switch 22 $t_c$ for each cycle of switch closure as a function of maximum current and inductive load of the inductive section 20 relative to the voltage across the induction section 20. The control operator 28 can monitor the current through the inductive section 20 as a feedback control for the determination of the duration of closure of the switch 22 $t_c$ for each cycle of switch closure to ensure that maximum current to the inductive circuit is limited.

One non-limiting example of a maximum current for control operation may include a maximum current of 25 amps through the inductive section 20. The time on $$(t_{ON}) = \frac{\text{Duty Cycle}}{\text{Frequency}}, \text{ where } V = L\frac{di}{dt} \text{ and}$$

$$i = \frac{(Bat\ V - Cap\ V) * tON}{L} \leq 25 \text{ amps.}$$

Once 25 amps is reached through the inductive section 20, the switch 22 is operated to open, for example, for a predetermined time, and reclose for the current ramp to start anew. After being closed, opening the switch 22 stops the flow of current from the source 14 through the inductive section 20. However, the inductive section 20 continues to impose current flow upon initial opening of switch 22 due to the stored energy of the inductor(s). With the switch 22 open, the imposed current flow from the inductive section 20 can continue to flow to the load 16, but rather than pass through the switch 22 to return to the negative terminal of the source 14, the imposed current flow from the inductive section 20 returns through the oneway element 24 to the inductive section 20 (e.g., between the source 14 and the inductive section 20). The energy dissipated by the inductive section 20 into the bus section 15 (and illustratively the load 16) by the imposed current of the inductive section 20 under opening of switch 22 raises the voltage across the bus section 15 reducing the voltage differential between the source 14 and the bus section 15. Reducing the voltage differential between the source 14 and the bus section 15 (and illustratively the load 16) can reduce the likelihood of damage and/or maintain the working life of components, such as load components. Upon (at least partial) dissipation of stored energy in the inductive section 20, the switch 20 can be closed for one or more additional cycles. Cycling of the switch 22 can be performed to lower the voltage differential between the source 14 and bus section 15 to preferred levels by increments according to the disclosed control operations.

Figure 4:
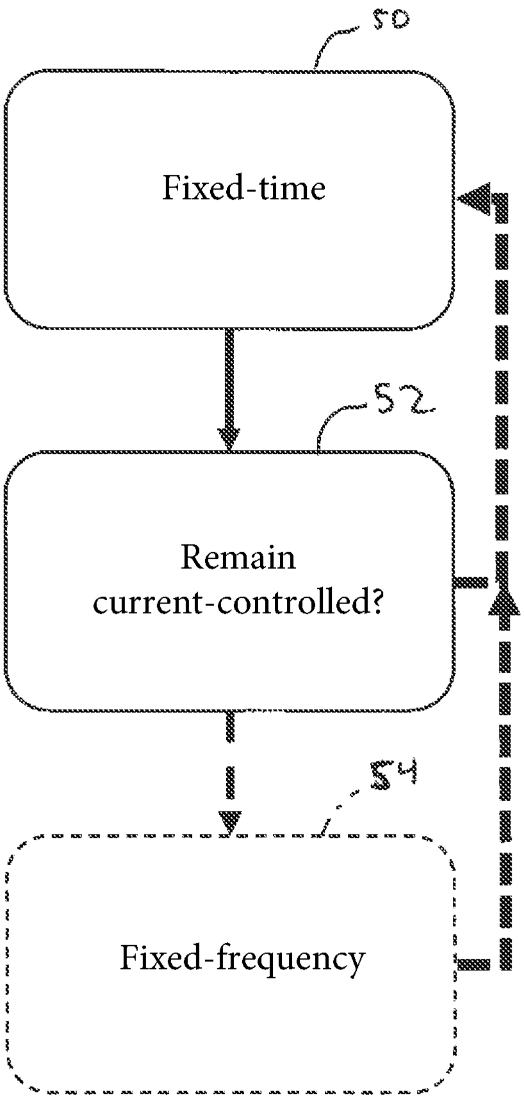
FIG. 4 is a diagrammatic view of a series of operations of the precharge system of the electrical system of FIGS. 1-3.

Referring now to FIG. 4, operations of the precharge system 18 in various modes are illustrated. In box 50, the control operator 28 has received indication of contactor closure to communicate the source 14 and the load 16 (sink), and executes the fixed-time mode. The control operator 28 can monitor the voltage differential between the source 14 and the load 16. Once the voltage differential between the source 14 and the load 16 reaches a threshold level, the control operator 28 can proceed to box 52 to operate in the current-controlled mode.

In box 52, the control operator 28 operates in the current-controlled mode using feedback of current through the inductive section 20. In the current-controlled mode, the control operator 28 can monitor the voltage differential between the source 14 and the load 16, and can determine whether to remain in the current controlled mode in box 52, to return to the fixed-time mode in box 50, and/or to terminate the precharge system 18 operations and proceed to full contactor closure. In some embodiments, the acceptable threshold voltage differential for closing the contactor 62 may be within the range of about 1 to about 2 volts. The control operator 28 may optionally determine to proceed to a fixed-frequency mode in box 54 as discussed in additional detail hereafter.

The control operator 28 may determine to remain in current-controlled mode in box 52 in response to the voltage differential remaining above the voltage threshold. The control operator 28 may determine to return to fixed-time mode in response to a problem and/or uncertainty in the current flow through the inductive section 20. For example, monitoring the voltage on the bus section 15, the control operator 28 may determine that despite active switching little or no rise in the voltage has occurred such that the voltage differential between the source 14 and the load 16 has reduced by little or no amount. The control operator 28 may determine, responsive to voltage rise being outside of an expected range, to return to fixed-time mode. The expected range may include a predetermined threshold voltage rise (and/or change in voltage differential), such that responsive to determination that the predetermined threshold voltage rise has not been achieved, for example, within a predetermined time period and/or predetermined number of switch cycles, the control operator 28 may return to the fixed-time mode. The control operator 28 may determine to proceed to terminate the precharge system 18 operations responsive to reaching threshold voltage differential between the source 14 and load 16 such that safe contactor closure can be provided to communicate the source 14 and the load 16.

In some embodiments, the control operator 28 may determine to proceed to operate in a fixed-frequency mode as indicated in box 54. In the fixed-frequency mode, the control operator 28 can manage peak current by actively controlling the time delta (e.g., period for $t_{ON}$) at every measured voltage across the inductive section 20 to maintain the peak current (or close to peak current) for all switch cycles. The control operator 28 may recalculate the time delta continuously or after a predetermined number of switch cycles. For example, the control operator 28 may be configured to perform recalculation of the time delta for each switch cycle, which can increase responsiveness of the system. The control operator 28 may alternatively be configured to perform recalculation of the time delta periodically, after a predetermined number of switch cycles, which can reduce computational requirements of the system. Responsive to reaching a threshold low voltage differential between the source and load, the control operator 28 may determine to proceed to terminate the precharge system 18 operations such that safe contactor closure can be provided to communicate the source 14 and the load 16. In some embodiments, the control operator 28 may return to other operating modes, for example, under timeout from a certain mode without achieving desired voltage differential between the source and load, and/or in response to detection of increased voltage differential.

In the fixed-time mode, the precharge circuit 18 may be operated using open loops controls such that no feedback loop is required to maintain the fixed-time interval. In the current-controlled mode, the precharge circuit 18 may be operated in an active, full feedback manner such that feedback is provided for consideration by the control operator 24 on each cycle of switch 24. In the fixed-frequency mode, the precharge circuit 18 may be operated on a partial feedback loop in which feedback is provided after a number of cycles, which may include one or more cycles.

Figure 5:
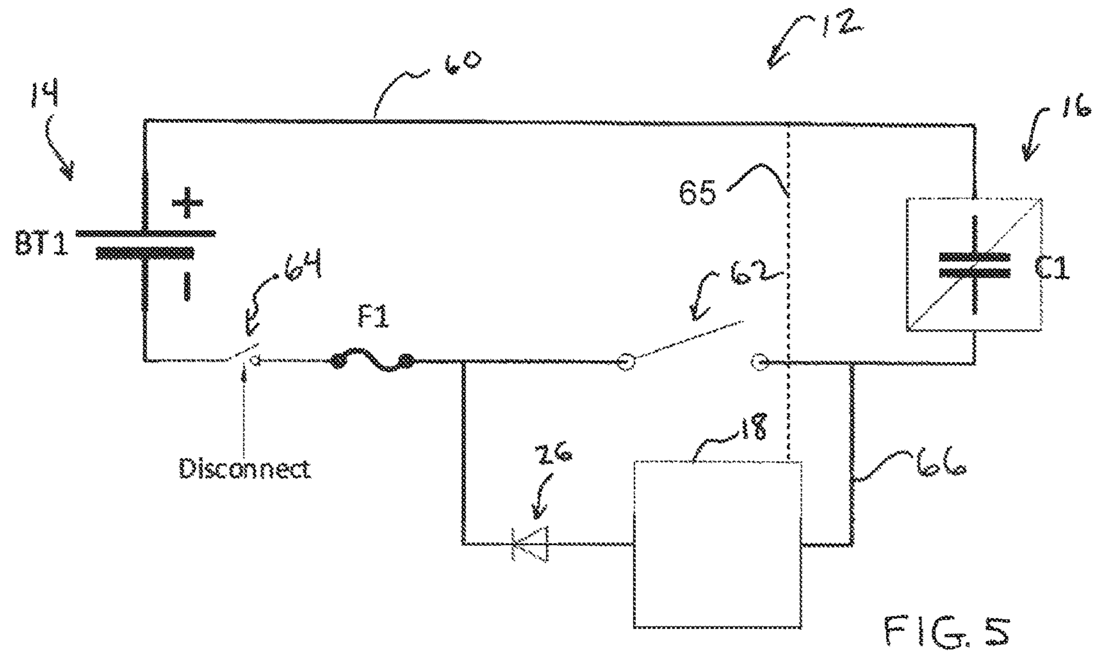
FIG. 5 is a diagrammatic view of the electrical system of FIGS. 1-4 including a contactor arranged in parallel with the precharge system.

Referring now to FIG. 5, the electrical system 12 is shown in a broad diagrammatic implementation. The source 14 is connected with the load 16 by circuit line 60 which can include the contactor 62. When the contactor 62 is open the circuit line 60 is disconnected for electrical communication between the source 14 and the load 16, and when the contactor 62 is closed the circuit line 60 is connected for electrical communication between the source 14 and the load 16. The circuit line 60 may include other connection components such as fuse F1 and/or disconnect 64. The connection line 65 represents the circuit path for the freewheeling diode 24 with positive polarity side of the circuit.

The contactor 62 can be arranged in parallel with the precharge system 18 via circuit line 66. The protection diode 26 is illustratively shown in series with the precharge system 18 on circuit line 66. Operation of the precharge system 18, as discussed herein, can precharge the circuit line 66 when the contactor 62 is open to avoid the issues with contactor closure across systems with high differential voltage. Accordingly, the precharge system 18 can be operated to provide adaptable and/or controlled precharging of the circuit line 60 for closure of contactor 62. As the precharge system 18 operates by programmable operations, the precharge system 18 can be implemented across a wide variety of systems without requiring redesign of electrical components, such as required in purely resistive precharge arrangements.

Figure 6:
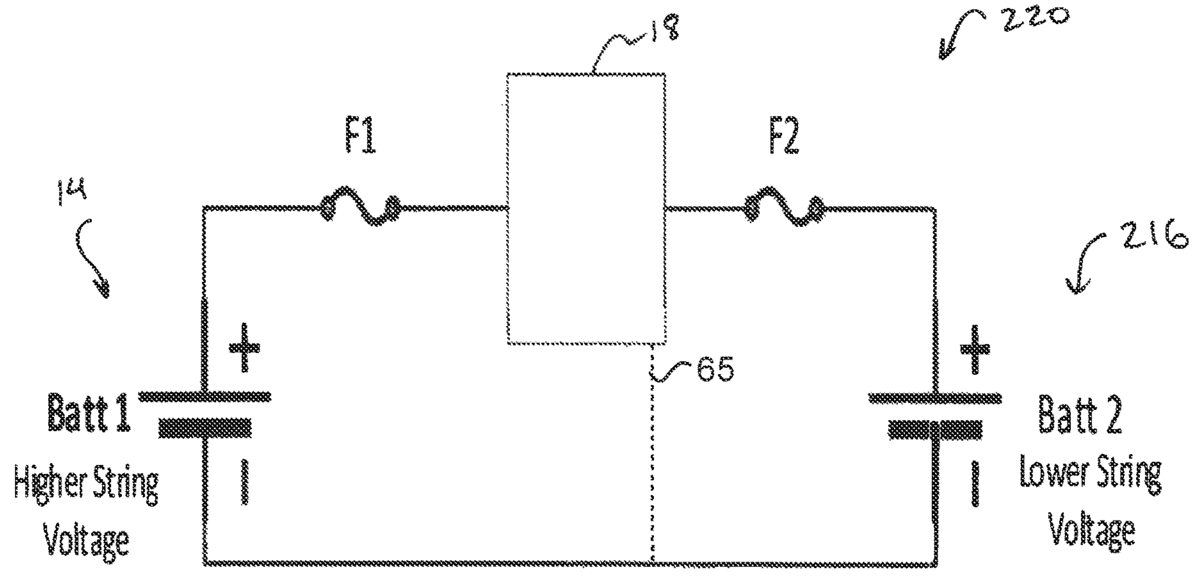
FIG. 6 is a diagrammatic view of another electrical system similar to the electrical system of FIGS. 1-5 having the precharge system arranged between a source as a battery and a sink as another battery having lower voltage than the source.

Referring now to FIG. 6, another illustrative embodiment of an electrical system 220 is shown. The electrical system 220 may include the source 14 embodied as a DC voltage source, and more particularly as a battery string having a voltage. The precharge system 18 can be arranged in series with a load 216 embodied as another battery string having an initial voltage lower than the source 14.

In electrical system 220, the precharge system 18 can be operated to provide precharging of the load 216 in similar manner as discussed above regarding the electrical system 12. In system 220, connection line 65 represents the circuit path for the freewheeling diode 24 with negative polarity side of the circuit. In electrical system 220, the precharge system 18 can also operate as itself a contactor for continual closure, once acceptable voltage differential is achieved between the source 14 and load 216, in lieu of or in addition to a separate contactor 62 arranged in parallel with the precharge system 18. In some embodiments, the precharge system 18 can be arranged as a contactor on the negative polarity side of the circuit in communication with the positive polarity side of the circuit. Accordingly, the precharge system 18 can be implemented as a string balancer to allow battery maintenance. For example, the precharge system 18 can be applied between battery cells to allow balancing of disparate voltage levels between the cells, to maintain battery health.

Figure 7:
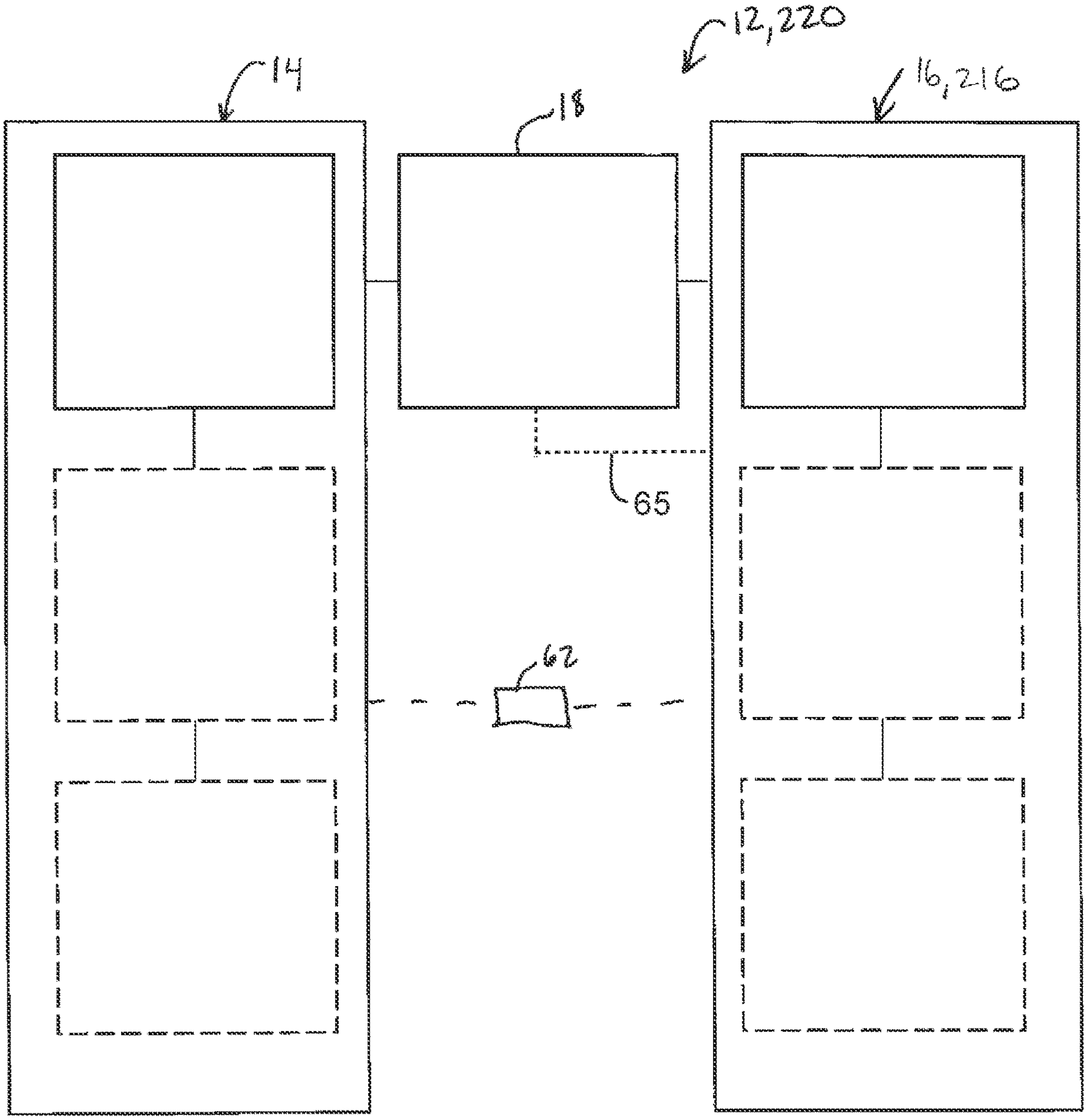
FIG. 7. is a diagrammatic view of the electrical system of FIGS. 1-6 showing the precharge system arranged in communication with a number of voltage sources to receive power, and showing the precharge system arranged in communication with a number of sinks to provide power.

Referring now to FIG. 7, the electrical system 12, 220 is shown including source 14 comprising a number of voltage sources which may be arranged in any suitable manner including in series and/or in parallel to provide power for precharging via precharge system 18. The electrical system 12, 220 may include load 16, 216 having a number of loads which may be arranged in any suitable manner including in series and/or in parallel to receive power for precharging via precharge system 18. As shown in FIG. 7, the connection line 65 represents the circuit path for the freewheeling diode 24 with opposite (positive or negative) polarity side of the circuit.

Figure 8A:
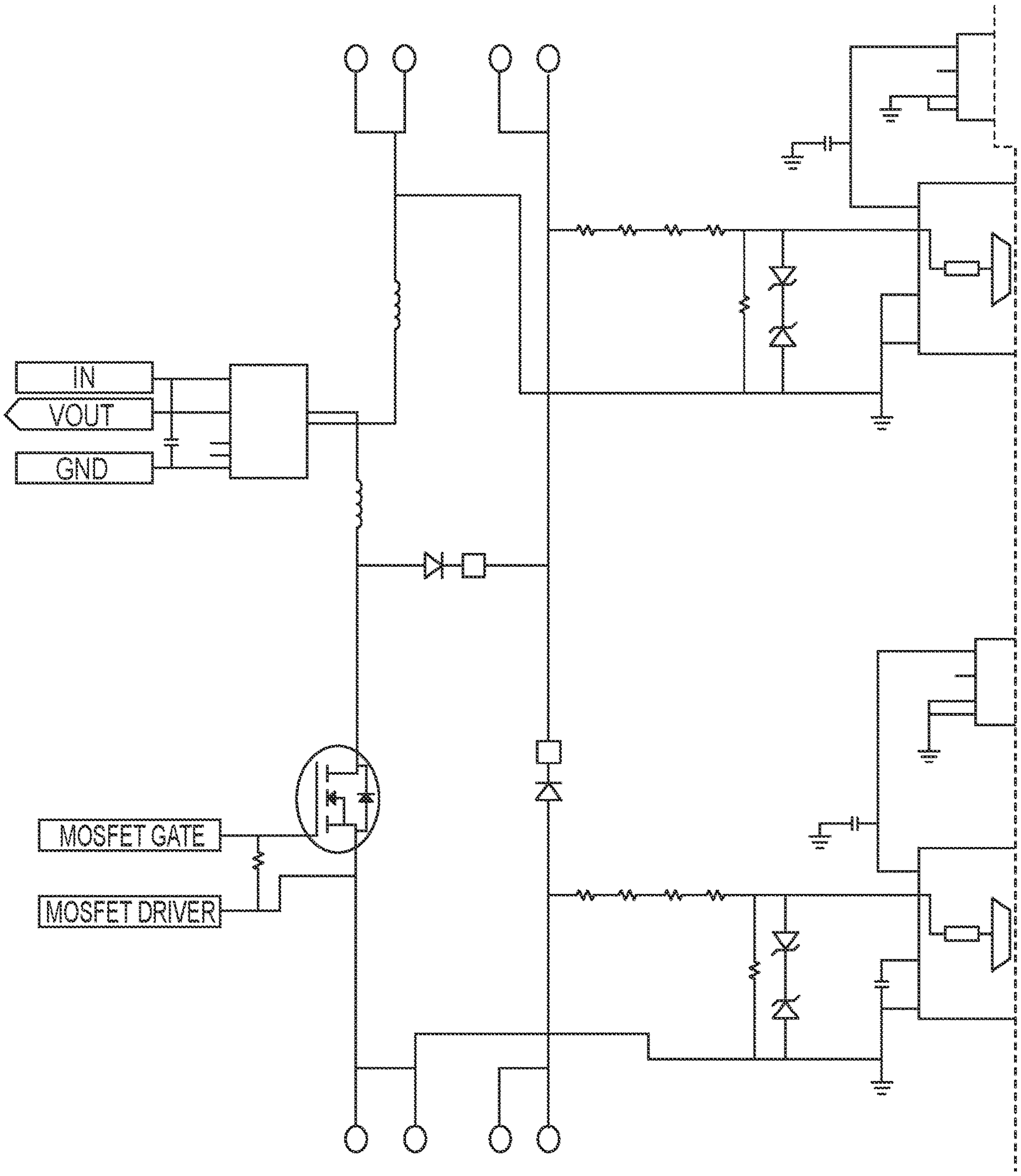
FIGS. 8A & 8B are each portions of a diagrammatic view of an exemplary schematic which can implement aspects of the electrical systems of FIGS. 1-7.
Figure 8B:
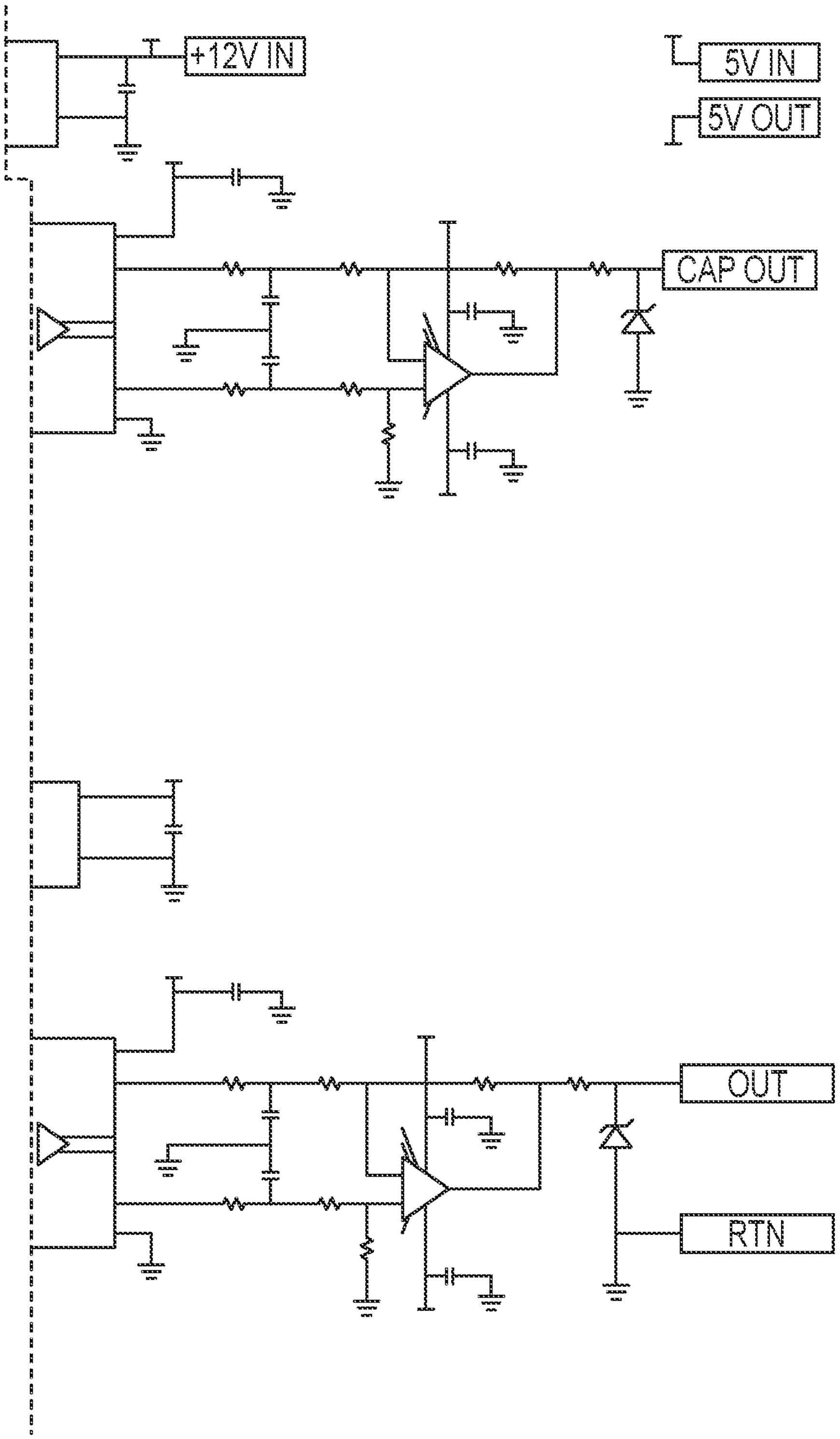

Referring now to FIG. 8, an exemplary schematic of circuitry arrangements which may be implemented with the precharge system 18 within electrical system 12, 220. Various circuitry components such as operational amplifiers, sensors, resistors, capacitors, inductors, gates, diodes, wiring, among others, are shown arranged for providing precharge system 18 operations by applying various electrical signal processing, conditioning, and/or application techniques.

Within the present disclosure, circuit arrangements may be informed by The equation that goes along with the circuit is $$Cap\ \mathrm{V} = \frac{idt}{\sqrt{\frac{2E}{C}}} + \sqrt{\frac{2E}{L}} \times \mathrm{frequency}.$$

The simplified version of this equation is $$Cap\ \mathrm{V} = \frac{\mathrm{Coulomb}}{\mathrm{Voltage}} + Irms \times \mathrm{Frequency}.$$

The precharge system 18 within the present disclosure may allow versatile application within different electrical systems without excessive component redesign, and generally with merely determination of the appropriate time constants for the different electrical systems. Accordingly, devices, systems, and methods within the present disclosure can provide flexibility of implementation, longevity in lifetime, and/or operational control. Disclosed embodiments may reduce inductive kick which can enable energy transfer without undesirably high voltage differential.

The present disclosure includes communication between a power source and load. Illustrative power sources include direct current (DC) sources, but in some embodiments may include alternative current (AC) sources. DC sources may also include power from AC sources inverted to DC power, for example, by suitable circuitry. Illustrative loads include DC loads, such as batteries and/or DC grid sections, but in some embodiments may include AC loads. In illustrative examples, capacitive loads may represent power storage devices, such as a batteries. Pre-charging battery loads before contactor closure can assist in reducing damage to battery components, and/or increasing lifetime of battery components. Within the figures, the following non-limiting guidance references can assist understanding: C1 (capacitance), Q1 (switch), BT1 or Batt1 (battery), F1 or F2 (fuse).

Electrification of many systems is underway to assist in decarbonization of resources. High voltage electric charging is important to achieving such electrification goals. Devices, systems, and methods for adaptable precharge within the present disclosure can provide precharge solutions that can permit safe and reliable high voltage connection to a variety of loads. For example, in the electric vehicle (EV) arena, various types of EV battery systems exist, which may have varying designs and architectures. Many EV battery platforms may be based on a 400V system voltage capable of charging with 400V charge sources or higher. However, EV batteries with higher system voltage, such as 800V baseline system voltages capable of charging with 800V or higher charge sources, may simultaneously exist in the market. Devices, systems, and methods within the present disclosure can provide adaptable precharging to accommodate both 400V and 800V baseline systems, without the need for specialty circuitry designed for a particular baseline system voltage, while maintaining long lifetime and/or decreasing the risk of damage to components. In some embodiments, any suitable range of voltages can be accommodated for example, 200V, 400V, 600V, 800V, 1000V, and 4000V and higher.

Within the present disclosure, examples of suitable processors may include one or more microprocessors, integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others. Communication circuitry may include suitable components for facilitating processor operations, for example, suitable components may include transmitters, receivers, modulators, demodulators, filters, modems, analog/digital (AD or DA) converters, diodes, switches, operational amplifiers, and/or integrated circuits.

Although certain illustrative embodiments have been described in detail above, variations and modifications exist within the scope and spirit of this disclosure as described and as defined in the following claims.

We claim:

1. An adaptable precharge system for managing voltage drop for contactor operation between open and closed configurations, the system comprising:

an inductive circuit section comprising at least one inductive element adapted for connection with a current sink;

a switch in communication with the inductive circuit section to selectively transmit current to reduce the voltage drop;

a oneway current circuit section arranged for communication between the switch and a load section, wherein the load section comprises the inductive circuit section and the current sink connected in series with each other, wherein the oneway current circuit section is arranged in parallel with the load section; and a control operator for directing operation of the switch to govern a voltage differential between the load section and a source voltage for managing the voltage drop for contactor operation, wherein the control operator is configured to operate initially in a fixed-time mode for pre-charging and to operate subsequently in a current-controlled mode for pre-charging, wherein the fixed-time mode includes cycling switch operation for repeated closure in which all cycles of switch closure have the same control time defined as a predetermined duration of closure as directed by the control operator, and the current-controlled mode includes cycling switch operation for repeated closure in which each cycle of switch closure is actively directed by the control operator to have an independent duration of closure to limit maximum current for each independent cycle.

2. The system claim 1, wherein the switch is arranged in communication with a negative voltage segment of each of the voltage source and the load section.

3. The system claim 1, wherein in the fixed-time mode the control operator operates the switch to manage peak current provided to the inductive circuit section for the predetermined duration of closure based on the input voltage.

4. The system of claim 3, wherein the predetermined duration of closure is determined by setting a maximum allowable voltage across the inductive circuit section based on the input voltage.

5. The system claim 1, wherein the control time is associated with the at least one inductive element as a function of maximum current and an inductive load of the inductive circuit section relative to voltage across the inductive circuit section.

6. The system claim 1, wherein the control operator monitors current through the inductive circuit section as feedback for determination of the independent duration of closure.

7. The system claim 1, wherein the control operator is configured to operate the switch to provide a fixed-frequency mode.

8. The system of claim 7, wherein in the fixed-frequency mode the control operator operates the switch to manage peak current by regulating a time delta for switch closure based on voltage across the inductive circuit section.

9. The system of claim 1, wherein the source voltage is from a power source comprising a high voltage DC source.

10. The system of claim 1, wherein the source voltage is from a power source having voltage greater than the current sink.

11. The system of claim 10, wherein the power source includes a number of battery cells having voltage greater than the current sink.

12. The system of claim 10, wherein the current sink includes a number of battery cells.

13. The system of claim 10, wherein the power source includes a portion of an isolated grid having voltage greater than the current sink.

14. The system of claim 13, wherein the current sink includes another portion of the isolated grid.

15. The system of claim 1, wherein the control operator is configured to change operation from the fixed-time mode to the current-controlled mode in response to the voltage differential between the load section and the source voltage reaching a threshold voltage differential value.

* * * * *